United States Patent [19]

Vitale et al.

[11] Patent Number: 4,941,281

[45] Date of Patent: Jul. 17, 1990

[54] DOWNRIGGER WITH LEVERAGE LINE CLAMP AND FISH ATTRACTING MEANS

[76] Inventors: Roger H. Vitale, 3324 N. Government Way, Coeur d'Alene, Id. 83814; Ronald F. Howard, S. 109 Neyland #3, Liberty Lake, Wash. 99019

[21] Appl. No.: 396,108

[22] Filed: Aug. 21, 1989

[51] Int. Cl.⁵ .............................................. A01K 91/00
[52] U.S. Cl. .................................... 43/43.12; 43/43.13
[58] Field of Search ................. 43/42.12, 42.13, 42.14, 43/27.4

[56] References Cited

U.S. PATENT DOCUMENTS

| | | | |
|---|---|---|---|
| 2,545,185 | 3/1951 | Winslow | 43/43.12 |
| 2,786,296 | 3/1957 | Loebenstein | 43/43.12 |
| 3,466,787 | 9/1969 | Collins | 43/43.14 |
| 3,835,573 | 9/1974 | Borchardt | 43/43.12 |
| 3,978,811 | 9/1976 | Angus | 43/43.13 |
| 4,161,078 | 7/1979 | Pagani | 43/43.13 |
| 4,255,890 | 3/1981 | Smith | 43/43.12 |
| 4,430,823 | 2/1984 | Henze | 43/43.12 |

*Primary Examiner*—Kurt Rowan
*Attorney, Agent, or Firm*—Keith S. Bergman

[57] ABSTRACT

A weighted downrigger for troll fishing provides a vertical stabilizing fin having a medial rotatable member to aid in attracting fish and a jaw-type line clamp to releasably fasten a fishing line inwardly adjacent a lure. The stabilizing fin and rotating element both provide light reflecting surfaces, which may additionally be colored, to optically attract fish. The rotating element provides additional acoustical-like attraction for fish. The line clamp provides adjustable tensioning structure and an elongate lever arm on one jaw to magnify the force of a fishing line trailing from the lever arm to cause clamp release responsive to less force on the trailing end of a fishing line than on the inboard end of such line.

15 Claims, 2 Drawing Sheets

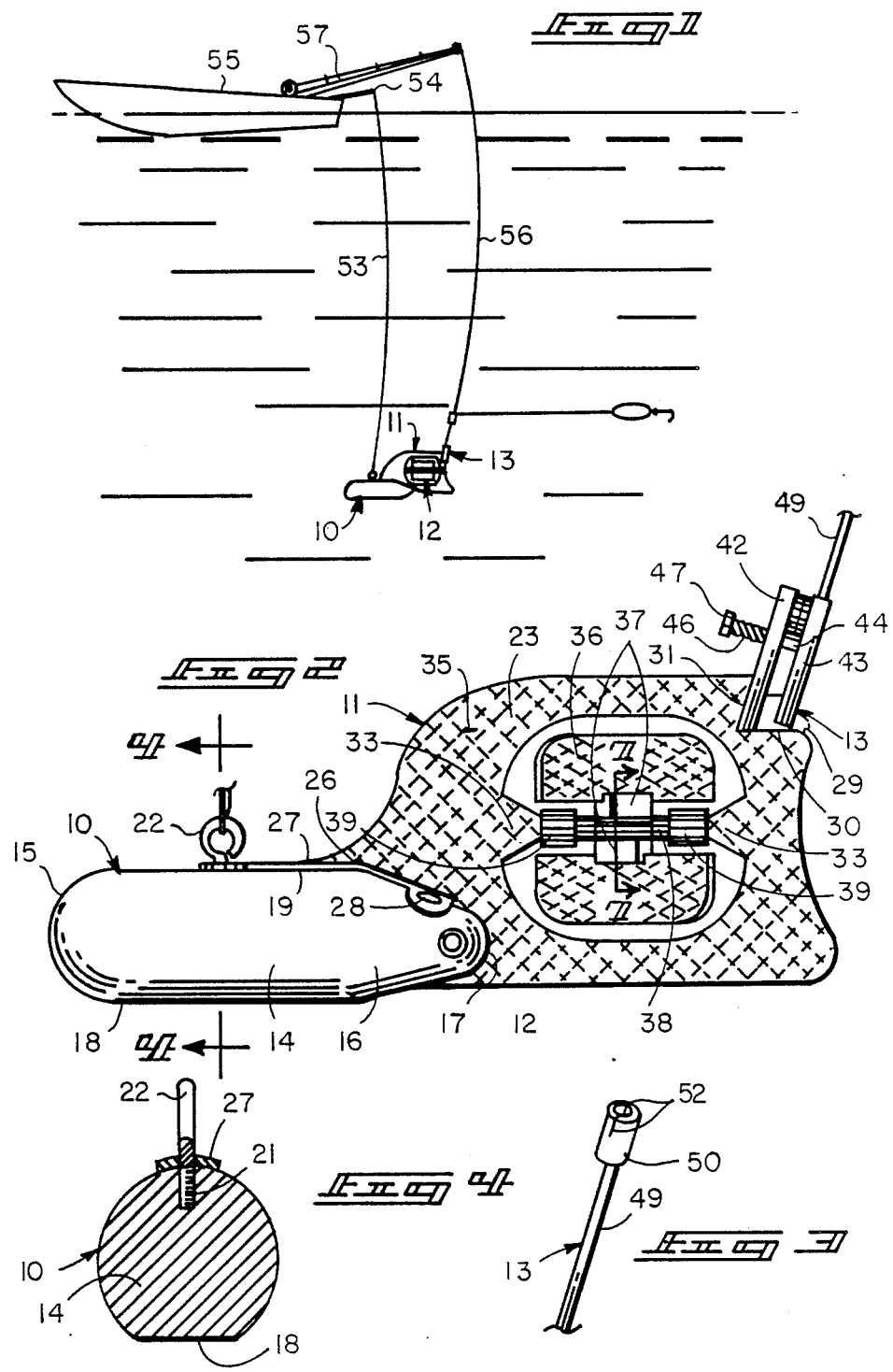

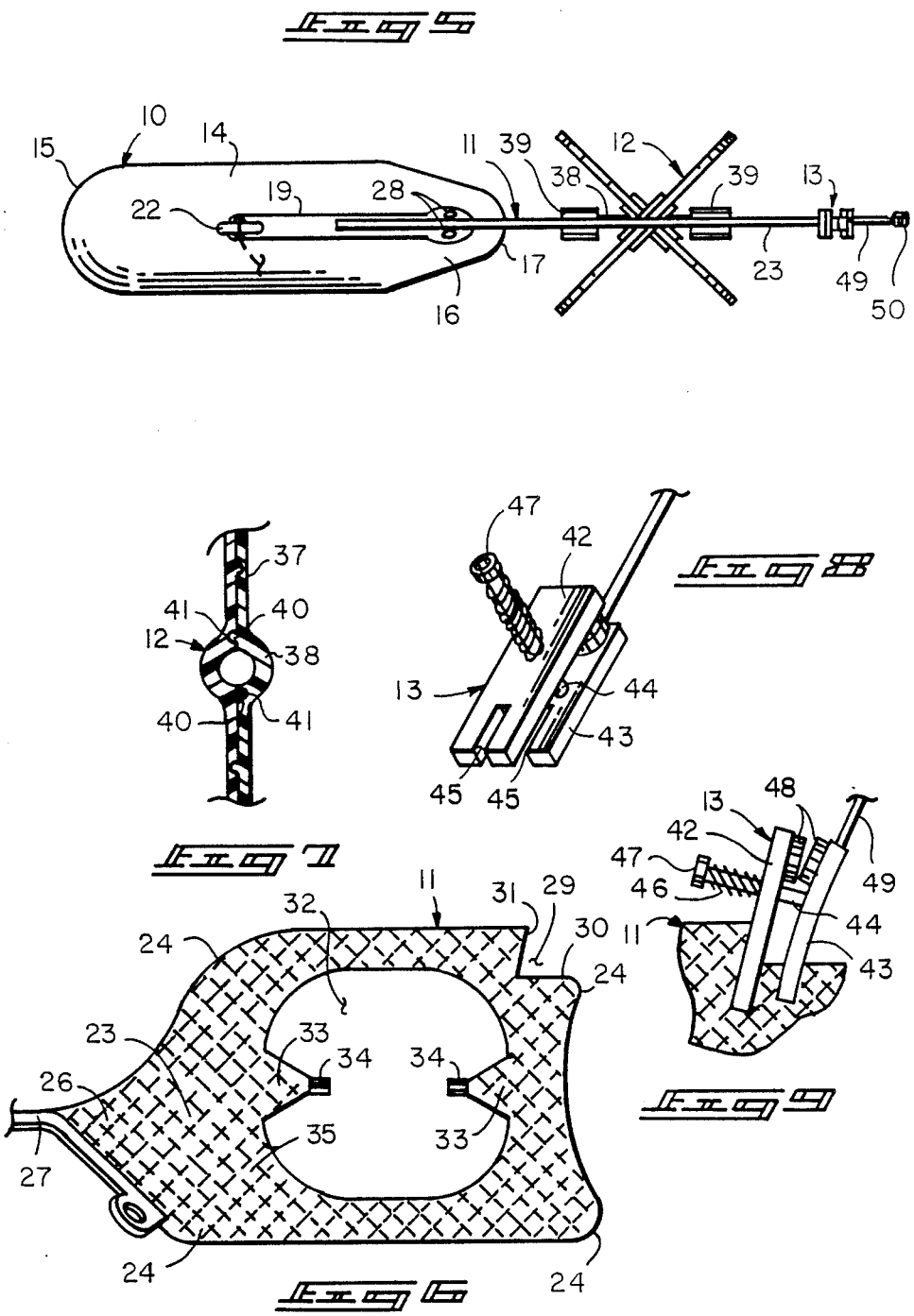

DOWNRIGGER WITH LEVERAGE LINE CLAMP AND FISH ATTRACTING MEANS

BACKGROUND OF INVENTION

A. Related Applications

There are no applications for patent related hereto heretofore filed in this or any foreign country.

B. Field of Invention

This invention relates generally to weighted downriggers for troll fishing and more particularly to such a downrigger having a vertical stabilizing fin with means to attract fish and a leveraged line holding clamp.

C. Description of the Prior Art.

In troll-type fishing it commonly is necessary to maintain a fishing lure at substantial depths beneath the surface of a body of water to effectively catch fish. Commonly with most smaller game fish, it is not feasible to maintain sufficient weight on a fishing line itself to establish a lure at appropriate depths because of the quite substantial drag of both the fishing line and weighting elements in moving through water, especially when considered in comparison to the size of a fish to be caught and the forces that might be created on a fishing line by that fish. Responsive to this problem so-called "downriggers have come into use to maintain fishing lines at appropriate depths without disrupting other fishing processes.

These downriggers are suspended by a downrigger line, separate from a fishing line and carried by a support structure on a boat. This type of downrigger suspension eliminates the problem of downrigger drag on a fishing line, as that force is carried by the downrigger line. With such downriggers, an associated fishing line is fastened to the downrigger by some type of releaseable clamp that holds the fishing line spacedly inwardly adjacent a lure. Such fishing line clamps are releasable upon appropriate force being exerted upon either end of a fishing line passing away from the clamp. Our invention provides an improved downrigger of this type.

Traditional downriggers of the prior art have generally not been concerned with features other than sufficient weight to serve their purpose. Such downriggers are not of particularly streamlined shape and often do not provide suspension lines that minimize water resistance, both of which result in substantial drag forces when the downrigger moves through water. Additionally such downriggers have not been stable in maintaining a uniform course in moving through water, but rather have been erratic and often moved in an undulating course, particularly in a horizontal direction.

Such prior downriggers have often had sufficient drag that with normal weight, they are not maintained beneath a supporting boat during trolling activities, but rather trail substantially rearwardly of a boat. This is not desirable as many fishermen that use downriggers also use display type depth-finding devices, and it is preferred that a downrigger be observable by such devices. Excessive drag may, if it exists, move a downrigger out of the cone observed by depth finders.

Our invention seeks to solve these problems by providing a downrigger that has a high density body with a streamlined shape and an oblately hemispherical nose to aid passage through water at the relevant speeds to reduce drag. Additionally, we provide a relatively low density vertical fin of substantial area extending rearwardly from the body to aid stabilization. We use a suspension line of small cross-section for the strengths required. These features tend to provide a downrigger that upon motion through water remains nearly vertically beneath its point of suspension and maintains a relatively stable and uniform course of passage through the water.

Known downriggers have generally been concerned only with their weighting function and have not provided any means to attract fish to increase the probability of those fish finding a lure associated with the downrigger. Our downrigger provides both optical and audio-like fish attractants. The stabilizing fin has surfaces formed of highly light reflective materials, such as are often used on fishing lures, so that the fin is highly visible to fish. The substantial area of the stabilizing fin and its motion through water both aid to enhance this feature. Additionally, we provide a rotating propeller in the medial portion of the stabilizing fin. This propeller also has surfaces that are formed of highly light reflective materials and may be colored to provide potential optical attractiveness of the device. These features are further enhanced by rotary motion of the porpeller which tends to move the reflective surfaces at different angles to a light source to produce a complex reflective pattern of continuously changing nature.

Additionally, the propeller provides an "acoustical" attractant for fish in generating fish sensible pressure waves in the water through which it passes by causing cavitation, motion or otherwise. Fish are more attracted to the vicinity of our downrigger than they are to the vicinity of downriggers not having these features, apparently by reason of the curiosity of the fish and their instinctual behavior associating bright, shiny surfaces and pressure disturbances with food.

Our invention provides a clamp-type line holding device that has lever means to multiply the force on the lure end of a line to cause release of the clip, while the clamp yet requires a substantially larger force on the supported or inboard end of the line to cause release. Line clamping devices of known downriggers traditionally have provided two clamping surfaces biased in surface adjacency, but movable against their bias to release a line carried therebetween. With such clamping devices the same force on either end of a line being held by such clamp will release the line. If a relatively small fish were caught by a lure on a fishing line held in such a clamp, the force that fish might exert upon the line oftentimes was not sufficient to cause the clamp to release. Many such prior clamps allowed adjustment of the required clamp release force, by but the drag of a line extending between fishing line support and a clamp was so large that that drag necessarily determined the lowest amount of force that could be allowed to release the clamp. Such line drag force often was substantially greater than the force caused by a small fish hooked on a lure, so that if a small fish were caught, it would not release the clamp, but rather would be dragged behind the downrigger with no knowledge of a fisherman that it had been caught.

Our invention provides a lever arm, extending from one jaw of an adjustable clamp, that carries a fishing line extending to a lure. The length of this lever arm allows the force exerted on a lure to be magnified in its action on the clamp jaw carrying it so that a fishing line will be released by small forces caused by a small fish that are less than the line drag force. The lever arm of our clamp may be releasably positionable to allow the use of interchangeable lever arms of different legths with the same clamp jaw to provide different leverage advantages.

Our invention resides not in any one of these features per se, but rather in the synergistic combination of all of them to provide the structures and the functions necessarily flowing therefrom, as herein specified and claimed.

SUMMARY OF THE INVENTION

Our invention provides a downrigger, with an elongate cylindrical body having an oblately hemispheroidal nose and a tapering rearward portion, formed of relatively dense material with a fastening eye above its center of gravity. The body carries a relatively thin, vertical stabilizing fin of substantial area extending above and rearwardly therefrom. The stabilizing fin defines a medial void carrying a rotatable propeller and supports a line clamp in its upper rearward portion. The surfaces of the stabilizing fin and the propeller are formed of light reflecting material and are optionally colored. The line clamp provides two relatively movable jaws adjustably biased toward each other, with one jaw having a lever arm with means for releasably interconnecting a fishing line thereto so that force on a fishing line portion carried by the lever arm is magnified to cause clamp release. The propeller and the clamp lever are releasably interconnected to their supports to allow interchangeability.

In providing such a device, it is:

A principal object of our invention to provide an improved downrigger for troll fishing that has a dense body of streamline shape for regular motion through water with minimal drag so that the downrigger is carried substantially below a boat supporting it.

A further object of our invention to provide such a downrigger that has a relatively thin, vertically oriented stabilizing fin of substantial area extending upwardly and rearwardly from the body to maintain regularity and stability of motion through water.

A further object of our invention to provide such a stabilizing fin that has a medial voids wherein a propeller is carried to rotate upon motion through the water to aid in attracting fish.

A still further object of our invention to provide such a stabilizing fin with light reflective surfaces on both the fin and propeller to provide an optical attractant for fish.

A still further object of our invention to provide such a downrigger that carries a line clamp in the upper rearward portion of the stabilizing fin to releasably clamp a fishing line and maintain it in a position in which it will not be entangled with the downrigger structure when the line is released therefrom.

A still further object of our invention to provide such a line clamp that has forward and rearward frictional jaws that are adjustably biased toward each other to clamp a fishing line therebetween, with the rearward jaw carrying an outwardly extending lever arm having means to releasably support the lure end of a fishing line to magnify the force on the lure end of the fishing line to cause release of that line from the clamp.

A still further object of our invention to provide such a downrigger that is of new and novel design, of rugged and durable nature, of simple and economic manufacture and otherwise well adapted to the uses and purposes for which it is intended.

Other and further objects of our invention will appear from the following specification and accompanying drawings which form a part hereof. In carrying out the objects of our invention, however, it is to be remembered that its accidental features are susceptible of changes in design and structural arrangement with only a practical and preferred embodiment being set forth, as is required.

BRIEF DESCRIPTION OF DRAWINGS

In the accompanying drawings which form a part hereof and wherein like numbers of reference refer to similar parts throughout:

FIG. 1 is a somewhat diagrammatic view showing a boat carrying a downrigger of our invention depending therebeneath with a fishing line releasably attached to the downrigger.

FIG. 2 is a an orthographic side view of our downrigger showing its parts, their configuration and relationship from its aspect.

FIG. 3 is a partial isometric view showing the line engaging portion of the lever arm of the line clamp structure.

FIG. 4 is a medial vertical cross-sectional view through the downrigger of FIG. 2, taken on the line 2—2 thereon in the direction of the arrows.

FIG. 5 is an orthographic top view of the downrigger illustrated in FIG. 2.

FIG. 6 is an orthographic side view of the stabilizer fin of our downrigger isolated from its associated structures.

FIG. 7 is a somewhat enlarged partial cross-sectional view showing the releasable fastening structure of the propeller parts.

FIG. 8 is a partial isometric view of the line clamp showing its various parts and their relationship.

FIG. 9 is a partial orthographic side view of the line clamp in place on the stabilizing fin.

DESCRIPTION OF PREFERRED EMBODIMENT

Our invention generally provides a downrigger having body 10 supporting stabilizing fin 11 which in turn carries medial propeller 12 and rearward line clamp 13.

Body 10 provides medial cylindrical portion 14 joining forward nose portion 15 and rearwardly tapering tail portion 16. Nose portion 15 is substantially of the hemispherical shape illustrated to allow streamline flow over the nose as it is moved at relatively slow trolling speeds through water. This shape should be chosen according to known technology to avoid substantial turbulence as the body moves through water. Rearward body portion 16 tapers to hemispherical end 17 approximately half of the diameter of the nose portion. The body is formed substantially as a surface of revolution with a flat bottom portion 18 to maintain the body in an upright position with some positional stability when it is supported on a flat surface. The length of the body is approximately three and one-half times its diameter, and the rearward tapering portion constitutes not more than approximately the rearward third of the structure, to provide stability with streamlined flow of water when the downrigger body is moved through water at traditional troll fishing speeds.

The upper portion of body 10 provides surface 19 to interfit with fastening rim 27 of the adjacent stabilizing fin. The portion of the downrigger body adjacent the fin structure provides appropriate fastener holes (not shown) to accept fasteners extending between the fin structure and the body to releasably position and mechanically interconnect these elements relative to each other.

The upper medial portion of the downrigger body defines internally threaded hole 21 to carry line fastening eye 22 of traditional closed loop configuuration. In the instance illustrated, the line fastening eye extends through the forward portion of the fastening rim of the stabilizing fin to serve the dual purpose of providing a fastening device for a suspension line and also releasably fastening the forward portion of the stabilizing fin to the body. For effective operation the fastening eye should be substantially vertically above the center of gravity of the entire downrigger structure when assembled as otherwise a downrigger may not be stable in its motion through water and may tend to yaw.

Stabilizing fin 11 provides relatively thin, planar body 23 of the somewhat rectilinear shape with rounded corners 24 illustrated. Forward portion 26 of the fin is configured to fit conformably on the upper rearward portion of body 10.

The lower part of forward fin portion 26 defines fastening rim 27 extending horizontally a spaced distance on each side of the fin body to conformably fit against the adjacent portion of the downrigger body to aid fastening of the two elements and also to provide additional strength to forward portion 26 of the fin. Plural headed bolts 28 extend through holes defined in rim 27 and into threaded engagement with cooperating holes defined in the body to releasably interconnect the fin structure with the downrigger body. It should be noted that the fin and bottom rim 27 might be so configured as to fit upon downrigger bodies of different shape than that illustrated, and particularly might be configured to fit upon existing downrigger body structures such as the ordinary spherical ball. This would allow use of our fin structures as an additive structure on existing downriggers with only slight and obvious modification.

The upper rearward portion of fin body 23 defines clamp notch 29, with lower edge 30 defined substantially parallel to the axis of downrigger body 10 and forward edge 31 defined in an angulated fashion with an upward and rearward slope as illustrated especially in FIG. 6. The size of the clamp notch is not critical, but should not be so large as to compromise the physical integrity of the fin structure and preferably is somewhat of the proportion illustrated in the drawings.

The medial portion of fin body 23 defines propeller orifice 32 of a shape and size to allow rotation of a propeller to be carried therein. The forward and rearward edges of the propeller orifice have inwardly projecting pillar portions 33 each defining in their inwardmost projections cylindrical journaling shafts 34 a spaced distance from each other. The axes of shafts 34 are coincident and substantially parallel to the axis of downrigger body 10 to provide a journaling means for a propeller to be carried thereby.

The stabilizing fin is formed of a reasonably rigid, durable material, preferably one of the more rigid and dense polymeric or resinous plastics, metal or wood. The exterior surface of fin body 23 is provided with light reflective material that preferably is also refractive so that light impinging upon the surfaces will be reflected and scattered to provide an optical attractant for fish within a visual range of the structure. The fin surfaces also may optionally be colored to provide additional optical attraction for fish. The material of preference for such purpose is embossed reflective sheet plastic material 35 which may contain metal flakes or powders to provide efficient reflective surfaces. Such material may be formed as an integral part of the reflective structure or may comprise a coating or relatively thin sheet of material adhered or otherwise mechanically attached to the supporting surfaces, all according to manufacturing methods well known in the art relating to such materials. Various known paint-like coating materials may also provide surfaces of similar nature that are optically attractive to fish.

Propeller 12 provides a rotatably mounted member carried within propeller void 32 defined by the fin to rotate responsive to motion of the propeller through water. In the instance illustrated, the propeller comprises two perpendicularly oriented blades having radially outer planar veins 36 which communicate by medial webs 37 to central shaft 38. As shown in FIG. 5, central shaft 38 is angled, symmetrically at forty-five degrees in the illustrated instance, to each propeller blade 36, 37. The central shaft at each of its ends defines cup bearings 39 configured and arrayed to fit upon journaling shafts 34 defined by the stabilizing fin.

The entire propeller members must have a peripheral configuration to allow it to rotate within propeller void 32 when carried within that void on shafts 34. Preferably, the propeller will be formed as two similar halves that are releasably interconnected to allow easy and ready placement and replacement or change. This can be accomplished, if the propeller structure be formed of somewhat resilient material especially such as plastic, by the traditional method shown in FIG. 7. Protuberances 40 having a bulbous shape fit with slightly more than half of their mass in mating indentations 41 defined in the opposing member, so that the protruding members may be inserted, with sufficient force to cause resilient deformation, into the indentations which then will capture them and tend to maintain them in fastened condition, until an opposite force unfastens the elements.

Preferably, at least outer blades 36 of the propeller have surfaces of some light reflecting material which is optically attractive to fish similar to that on the fin body. This material optionally may be colored and if so, may be the same or a different color than the stabilizing fin.

The propeller described is not essential and other rotatable propeller structures may serve the purposes of our invention. Preferably the propeller will not have a completely efficient or perfectly streamlined rotation, so that it causes some "noise" or disturbance in water it moves through as it rotates. This disturbance apparently creates pressure variations or similar phenomenon that appear to be perceptable by fish at a distance and serve as some type of a fish attractant.

Preferably body 10 of our downrigger is formed of some reasonably dense material that can provide necessary weight without too great a bulk. The material of preference is iron, though lead and other similarly dense materials may be used. Lead is not preferred, however, because of its potential for pollution and its presently perceived adverse environmental and health effects. If iron is used for the body, preferably it is covered on exposed surfaces with some protective covering, such as a paint or plastic coating, to prevent or retard oxidation caused by water, air or the combination of both. Such downrigger body coating may be colored, light reflective or both to provide an additional fish attractant.

The stabilizing fin and propeller are formed of some less dense material of appropriate strength and rigidity, such as a resinous or polymeric plastic. These preferred materials may be readily shaped and manufactured, are of relative economy, and are readily ornamented to provide coloration and reflective surfaces, either directly or by additive elements.

Clamp 13 is carried in clamp notch 29 defined in the upper rearward portion of stabilizing fin 11. As seen especially in FIG. 8, the clamp comprises forward jaw body 42 and spacedly adjacent rearward jaw body 43 interconnected by adjustment stud 44 extending from structural communication with the rearward body through an appropriate hole in the forward body and a spaced distance therebeyond. The lower portion of each jaw body 42, 43 defines medial slot 45 to allow the body to fit over lower edge 30 of clamp notch 29, as illustrated in FIG. 9. The jaw bodies are fastened to the fin by adhesion or other mechanical joinder. Adjustment stud 44 carries cylindrical compression spring 46 about its periphery between rearward clamp body arm 43 and adjustment nut 47 which is threadedly engaged on the end portion of the adjustment stud. Similar clamp pads 48 are carried by the end parts of the forward and rearward clamp bodies on their adjacent surfaces in such positions that the clamp pads meet in surface adjacency when adjustment nut 47 is in a relaxed outward position on the adjustment stud.

The clamp body elements are formed of semi-rigid, resiliently deformable materials, such as resinous or polymeric plastics or metal, and clamp pads 48 are formed of some material that has a frictional surface, such as elastomeric plastics or rubber. With this constituency and the structure described, the clamp pads may be adjustably positioned relative to each other with varying biasing force therebetween responsive to positioning of adjustment nut 47 on adjustment stud 44, to allow the pads to hold a portion of a fishing line therebetween with varying amounts of force required to cause its release, as hereinafter described.

Elongate line arm 49 is carried by frictional engagement in a hole (not shown) defined in the upper portion of rearward clamp body 43 and extends a spaced distance upwardly therefrom. Preferably the line arm, the rearward clamp body 43, or both are angled slightly rearwardly in their upper portions to provide easier release of a line carried by the line arm, but this is not necessary to our invention. The outer end portion of the line arm carries line fastener 50, which in the case illustrated is a piece of hollow resiliently deformable tubing defining in its outer end opposed line carrying slots 51 orientation substantially parallel to the axis of the downrigger body and the fin. The length of the line arm may vary to provide different amounts of leverage to act upon the clamp.

Having described the structure of our invention, its use and function may be understood.

A downrigger is formed according to the foregoing specification. As illustrated particularly in FIG. 1, outboard end downrigger line 53 is fastened to fastening eye 22. The inboard end of the downrigger line is carried by downrigger suspending structure 54 supported on a boat 55. A fishing line 56 carried on traditional rod and reel structure 57 in boat 55 supports lure 58 in its outboard end part. The fishing line spacedly inwardly of lure 58 is folded upon itself to form a somewhat "U" shaped configuration, and that "U" shaped portion is positioned between clamp pads 48 with both line ends extending somewhat upwardly therefrom. The lure end 56a of the fishing line is then brought upwardly along line arm 49 and positioned in line slits 52 defined in line fastener 50. The lure end 56a of the fishing line is allowed to trail from the line fastener. In this condition, the outrigger structure is ready for placement in a body of water for operation.

For operation, the downrigger and attached fishing line are placed in the water adjacent boat 55 supporting them. The fishing line is maintained so that it can feed freely from rod and reel structure 57. Downrigger line 53 is then payed out to lower the downrigger to the desired depth below boat 55. As this occurs, fishing line 56 will move downwardly with the downrigger by reason of its connection therewith. When once positioned, the downrigger line is fastened relative its support structure to maintain downrigger position and boat 55 is moved on the surface of water course 59 supporting it in a traditional troll fishing fashion. As this occurs, lure end 56a of the fishing line will trail behind the outrigger to move lure 58 carried by it to act in substantially the same fashion as the lure would act were it used in a troll fishing operation without the downrigger, As the downrigger is moved through water, the stabilizing fin will provide a light reflective surface and the propeller structure will provide a plurality of similar moving surfaces, all to cause an optical attractant for fish in a visually perceptive range of the device. The motion of the downrigger through water will cause rotation of propeller 12 and that rotation will cause variations in pressure in water surrounding the propeller, somewhat in the nature of sound waves in a gaseous medium, that are perceptable to fish. These pressure variations serve as an additional attractant to fish within their perceptable range.

As the downrigger strcuture is pulled through water, downrigger line 53 and fishing line 56 will have some resistance to motion through the water and because of their resilient nature will tend to form rearwardly concave configurations, as illustrated in FIG. 1. The exact nature of these curves depends upon various parameters, such as line width perpendicular to the course of motion, line resilience, weight of the downrigger, speed of motion and the like. This resistance is substantial and an ordinary fishing line of average submerged length at normal troll fishing speeds will cause a force of several ounces and often more than a pound. The force exerted upon fishing line 56 by clamp pads 48 must be sufficient to counteract this resistance or drag force of the line to maintain the line fastened within the clamp.

Often in troll fishing, a relatively small fish may be caught on lure 58 and forces caused by that fish on the lure end 56a of the fishing line may not be as great as the force required to maintain the fishing line in the clip. In the past with fishing line clamps not having the leveraged line arm of our invention, such a small fish would be undetected and would be dragged behind a downrigger until the downrigger was taken from the water and the fish then discovered.

In our invention, lure end 56a of a fishing line is carried by line fastener 50 at the outer end part of line arm 49. This line arm creates a lever to magnify forces on the lure end 56a of a fishing line that causes release of the line from the clamp structure. The force created on the lure acts through a lever arm extending from line fastener 50 to the point of mounting that clamp arm on fin 11, whereas the lever arm for the other clamp arm is from its fastening pad to the point of mounting on fin 11, which is less, substantially by the length of the line arm. Since line arm 49 is releasably positionable, various arms of differing lengths may be used interchangeably to regulate mechanical advantage of this leverage, but preferably the advantage is maintained in a range of about two to five to one.

With our invention then, even a small fish caught on a lure releases the clamping structure and the event is thereby annunciated to a fisherman who can reel in both the downrigger structure and fishing line and reset both for future operation to avoid the frustrations and time loss of unknowingly trolling with a small fish caught on a lure without knowing of its presence.

The foregoing description of our invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described our invention, what we desire to protect by Letters Patent, and what we claim is:

1. A troll fishing downrigger, having fish attracting means and a leveraged line clamp that releasably attaches a fishing line, comprising in combination:
    an elongate body having a streamlined shaped for low drag motion in water, and means for attachment of a downrigger line in its upper portion;
    a vertical stabilizing fin carried by the body and defining a medial propeller void and propeller connecting means;
    a propeller having means to rotatably interconnect with the propeller connecting means of the stabilizing fin to mount the propeller for rotary motion in the propeller void; and
    a line clamp, carried by the upper portion of the stabilizing fin, having
        forward and rearward spaced clamp arms extending a spaced distance upwardly from the stabilizing fin with other to form clamping surfaces in their upper portions,
        means to adjustably bias the clamp arms toward each other, and
        an elongate line arm extending a spaced distance upwardly from the rearward clamp arm with means for releasably fastening a fishing line in the upper end portion of the line arm.

2. The apparatus of claim 1 further characterized by the surface of the stabilizing fin having means to reflect light impinging thereon.

3. The apparatus of claim 1 further characterized by the surfaces of the propeller having means to reflect light impinging thereon.

4. The apparatus of claim 1 further characterized by the surface of the stabilizing fin and propeller being selectively colored.

5. The apparatus of claim 1 further characterized by the line arm being releasably carried by the rearward clamp arm to allow interchangeability of line arms.

6. The apparatus of claim 1 further characterized by a fishing line having a fishing lure in its end portion carried between the adjacent clamping surfaces of the line clamp slpacedly inward of the lure, with the lure end of the fishing line passing from the clamping surfaces and being releasably carried in the line fastening means of the line arm.

7. In a downrigger for troll fishing, having a weighted body with means for attachment of a downrigger line in its upper portion, the improvement comprising:
    a vertically oriented stabilizer fin releasably carried by the downrigger body to extend therefrom to stabilize motion of the downrigger body through water, said stabilizing fin defining a medial propeller void and having means to rotatably mount a propeller in the propeller void, and
    a propeller carried in the propeller void defined by the stabilizing fin for rotary motion responsive to motion of the downrigger through water.

8. The apparatus of claim 7 further characterized by:
    the propeller comprising two propeller blades each having paired opposed outer vane elements interconnected by medial web structure to a central shaft having bearing cups at each end, and
    the fin defining spaced opposed journaling shafts to engage the said bearing cups to mount the propeller for rotary motion.

9. The apparatus of claim 7 further characterized by surfaces of the stabilizing fin and propeller having means to reflect light impinging thereon.

10. The apparatus of claim 7 further characterized by the upper portion of the stabilizing fin carrying a jaw type clamp having
    two spaced clamp arms structurally joined in their portions to the stabilizing fin in forward and rearward relationship and extending upwardly therefrom, said clamp arms forming adjacent clamping surfaces in their outer portions, and
    a line arm extending a spaced distance upwardly from the rearward clamp arm, said line arm having means in its outer portion to releasably attach a fishing line.

11. The apparatus of claim 10 further characterized by the clamp arms having for adjustably regulating the clamping force between the clamping surfaces of said clamp arms.

12. The apparatus of claim 10 further characterized by the line arm being releasably carried by the rearward clamp arm to allow selective interchangeability of line arms of different lengths.

13. In a downrigger for troll fishing, having a weighted body with a forward and a rearward portion and supported beneath a boat by a down rigger line supported on the associated boat, the improvement comprising, in combination, a releasable fishing line clamp carried by the downrigger and having
    two spaced cooperating clamp arms extending outwardly a spaced distannce from support on the downrigger, in a forward and rearward relationship, to form adjacent clamping surfaces in their outer end portions to releasably clamp a portion of a fishing line therebetween, and
    a line arm extending a spaced distance outwardly from the rearward clamp arm, said line arm having means in its outer portion to releasably attach a fishing line to magnify forces on the fishing line carried by the said releasable attachment means required to release a fishing line releasably clamped between the clamping surfaces of the clamp arms.

14. The apparatus of claim 13 further characterized by the clamp arms having means for adjustably regulating the clamping force between the clamping surfaces of said clamp arms.

15. The apparatus of claim 13 further characterized by the line arm being releasably carried by the rearward clamp arm to allow selective interchangeability of line arms of different lengths.

* * * * *